United States Patent [19]

Funamoto

[11] Patent Number: 5,532,992
[45] Date of Patent: Jul. 2, 1996

[54] RECORDING AND REPRODUCING METHOD FOR WRITABLE TYPE DISK DRIVING APPARATUS

[75] Inventor: Kyota Funamoto, Tokorozawa, Japan

[73] Assignee: Pioneer Electronic Corporation, Tokyo, Japan

[21] Appl. No.: 302,376

[22] Filed: Sep. 7, 1994

Related U.S. Application Data

[63] Continuation of Ser. No. 903,168, Jun. 24, 1992, abandoned.

[30] Foreign Application Priority Data

Dec. 26, 1991 [JP] Japan ................................. 3-345210

[51] Int. Cl.⁶ ..................................... G11B 5/09
[52] U.S. Cl. ............................... 369/47; 369/58
[58] Field of Search .................... 369/58, 47, 48, 369/53, 54, 58, 124, 32; 360/72.1, 72.2

[56] References Cited

U.S. PATENT DOCUMENTS

| | | | |
|---|---|---|---|
| 4,774,700 | 9/1988 | Satoh et al. | 369/58 |
| 4,833,665 | 5/1989 | Tokumitsu et al. | 369/58 |
| 4,841,498 | 6/1989 | Sugimura et al. | 369/58 |
| 4,885,735 | 12/1989 | Fukushima et al. | 369/58 |
| 5,005,165 | 4/1991 | Yamanaka et al. | 369/58 |
| 5,111,444 | 5/1992 | Fukushima et al. | 369/58 |
| 5,132,956 | 7/1992 | Ichikawa | 369/58 |

FOREIGN PATENT DOCUMENTS

1-128266  5/1989  Japan.

*Primary Examiner*—Georgia Y. Epps
*Assistant Examiner*—P. W. Huber
*Attorney, Agent, or Firm*—Fish & Richardson

[57] ABSTRACT

A recording and reproducing method of a driving apparatus for a writable type disk, in which a substantial loading time of an optical disk are remarkably reduced and operations are quickly executed in response to a command. At the time of recording of information, after information has been written into an information recording area of a designated address, reading operation of latest defect management information is executed only in a case where the result of a verification reading process of the written information indicates a failure. At the time of reading of the recorded information as well, after the recorded information in the information recording area of the designated address has been read, the reading operation of the latest defect management information is executed only in a case where the read recorded information cannot be reproduced.

4 Claims, 7 Drawing Sheets

| | TRACK NUMBER | THE NUMBER OF TRACKS |
|---|---|---|
| CONTROL TRACK | | |
| MAP AREA #1 | 0 ~ 3 | (4 TRACKS) |
| MAP AREA #2 | 4 ~ 7 | (4 TRACKS) |
| ~ | | |
| MAP AREA #62 | 244 ~ 247 | (4 TRACKS) |
| MAP AREA #63 | 248 ~ 251 | (4 TRACKS) |
| USER AREA #1 | 252 ~ 565 | (314 TRACKS) |
| ALTERNATIVE AREA #1 | 566 ~ 569 | (4 TRACKS) |
| USER AREA #2 | 570 ~ 883 | (314 TRACKS) |
| ALTERNATIVE AREA #2 | 884 ~ 887 | (4 TRACKS) |
| ~ | | |
| USER AREA #61 | 19332~19645 | (314 TRACKS) |
| ALTERNATIVE AREA #61 | 19646~19649 | (4 TRACKS) |
| USER AREA #62 | 19650~19991 | (342 TRACKS) |
| ALTERNATIVE AREA #63 | 19992~19995 | (4 TRACKS) |
| ALTERNATIVE AREA #63 | 19996~19999 | (4 TRACKS) |

RECORDING AND REPRODUCING METHOD FOR WRITABLE TYPE DISK DRIVING APPARATUS

This application is a continuation of U.S. application Ser. No. 07/903,168 filed Jun. 24, 1992 now abandoned.

BACKGROUND OF THE INVENTION

1. Field of the Invention

This invention relates to a recording and reproducing method for an apparatus for driving a writable type disk.

2. Description of Background Information

Figure 1:
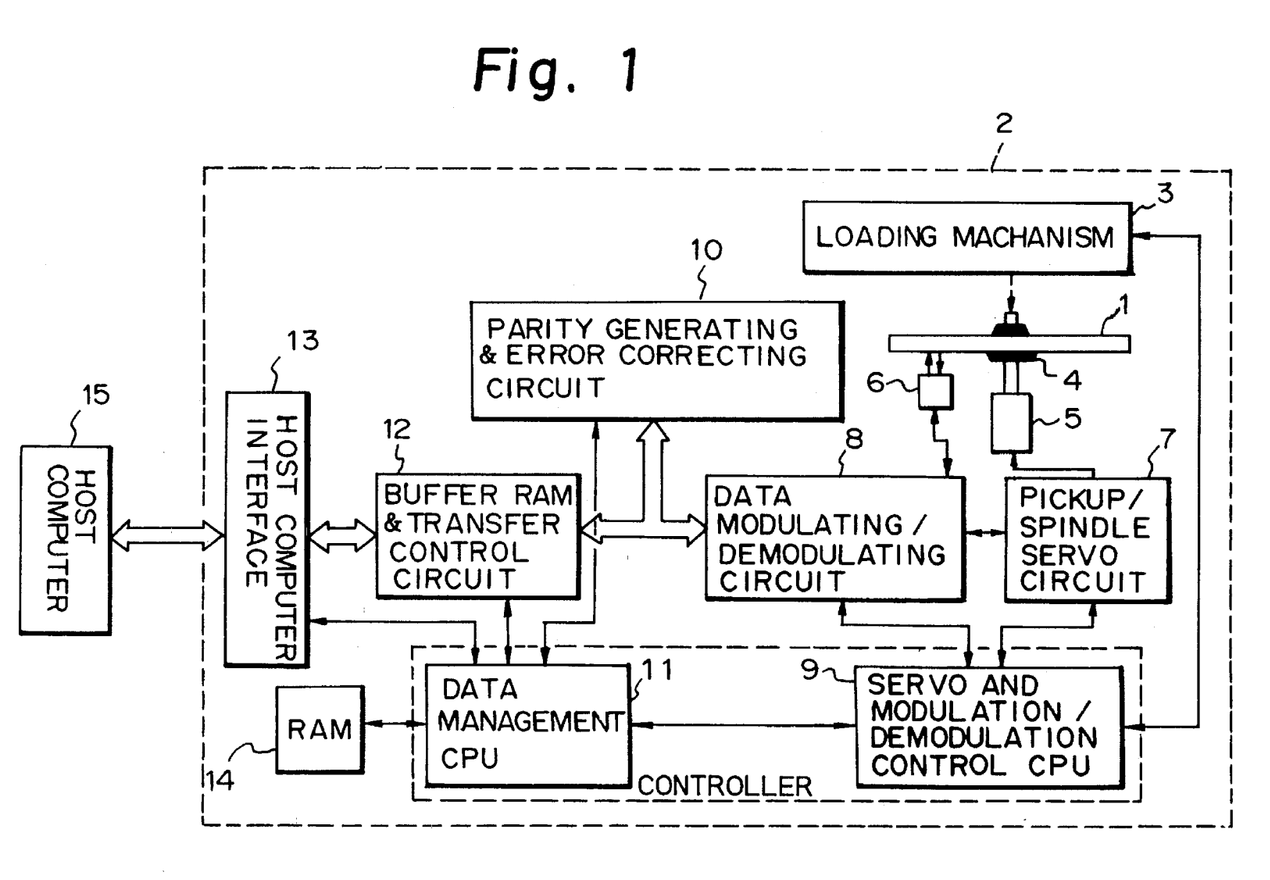
FIG. 1 is a block diagram showing an example of a construction of a driving apparatus for a writable type disk to which a recording and reproducing method according to the present invention is applied.

FIG. 1 shows an example of a construction of a writable type disk driving apparatus. The apparatus of FIG. 1 has the same fundamental construction as that disclosed in Japanese Patent Application Laid-Open No. 1-128266.

In the diagram, a WO (Write Once) type optical disk 1 as a writable type disk is shown, the disk functions as a bulk storage disk medium having a capacity of hundreds of megabytes up to a few gigabytes per disk. In a predetermined area on the optical disk 1, defect management information indicative of addresses of defective sectors and addresses of alternative sectors for the defective sectors is recorded.

The apparatus includes a loading mechanism 3 which is provided for loading the optical disk 1, which is inserted to the driving apparatus generally denoted by 2, on a turntable 4 or automatically withdrawing the optical disk 1 from the turntable 4, to eject the optical disk 1 out of the driving apparatus 2.

In the driving apparatus also includes is a recording and reproducing apparatus which comprises: a spindle motor 5; a pickup 6; a pickup/spindle servo circuit 7; a data modulating/demodulating circuit 8; a servo and modulation/demodulation control CPU 9; a parity generating and error correcting circuit 10; a data management CPU 11; a buffer RAM and data transfer control circuit 12; a host computer interface 13; and a memory 14. The recording/reproducing apparatus performs operations of recording information onto the optical disk 1 which has been loaded by the loading mechanism 3 or of reading out the recorded information from the optical disk.

The pickup/spindle servo circuit 7 has the function of controlling the rotation of the spindle motor 5 which rotates the turntable 4. The pickup/spindle servo circuit 7 also executes the focus and position controls of a write or read beam of the pickup 6 with respect to the information recorded on the optical disk 1, the supply of a recording signal to the pickup 6, the retrieval of a read signal from the pickup 6, and the like.

The data modulating/demodulating circuit 8 demodulates the read signal which is supplied from the pickup/spindle servo circuit 7 or modulates input data and supplies a recording signal of a predetermined format to the pickup/spindle servo circuit 7.

For the recording of information, the parity generating and error correcting circuit 10 adds parity check bits to information data to be recorded which is sent from the buffer RAM and transfer control circuit 12 and supplies to the data modulating/demodulating circuit 8 in cooperation with the data management CPU 11. When the recorded information on the optical disk 1 is being read, the circuit 10 performs a parity check to the demodulated read signal data which is sent from the data modulating/demodulating circuit 8 and detects a code error of such data also in cooperation with the CPU 11. When an error exists, the circuit 10 performs the correction of error. When the error is not correctable, the circuit 10 generates a correction unable signal. The corrected read signal data is supplied as reproduction signal data to the buffer RAM and transfer control circuit 12.

In cooperation with the data management CPU 11, the buffer RAM and transfer control circuit 12 sequentially stores the information data to be recorded supplied from a host computer 15 and transfers it to the circuit 10 and 8. The circuit 12 also sequentially stores the reproduction signal data and transfers it to the host computer interface 13.

The CPUs 9 and 11 as system controllers of such a recording/reproducing apparatus control each circuit so as to record the information sent from the host computer 15 onto the optical disk in response to commands which are given from the host computer 15 through an interface (for instance, SCSI: Small Computer System Interface) 13. The CPUs 9 and 11, on the contrary, control each circuit so as to read the recorded information from the optical disk and also controls so as to transfer the read information to the host computer 15. The CPUs 9 and 11 further control the loading mechanism 3. The CPU 11 controls the reading and writing operations of the RAM (random access memory) 14 to store the defect management information of the optical disk.

Figure 2:
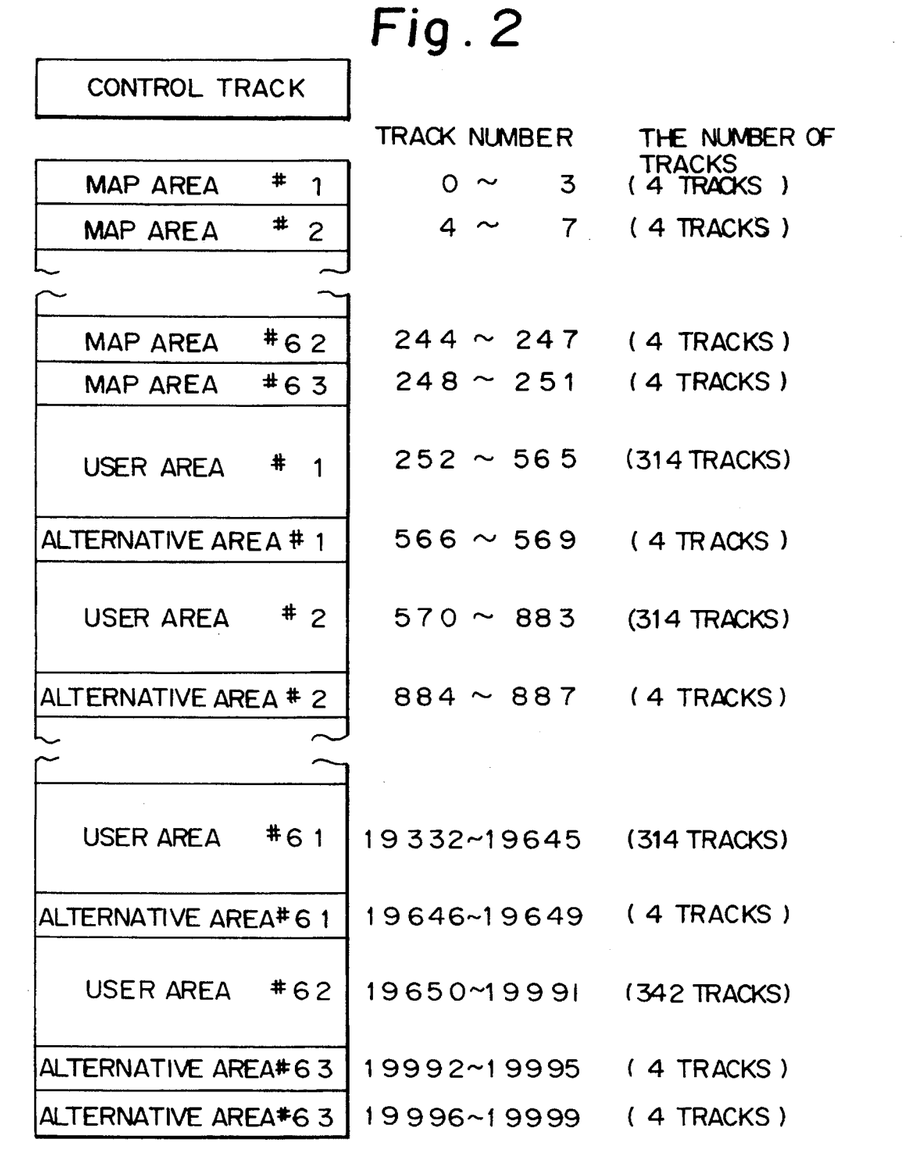
FIG. 2 is a block diagram showing an example of the band division in a disk and a format of the track number of each area.

FIG. 2 shows an example of a logical format in the WORM type optical disk 1 having a diameter of 130 mm. In the disk, 20000 tracks (track numbers 0 to 19999) are provided as tracks which can be used for any of a map area, a user area, and an alternative area. One track is constructed by 32 sectors. One sector has a capacity of 512 bytes.

The user area is an area (prime area) properly for the user to write or read data. The alternative area is an area which is prepared to rewrite the data of the sector which has been determined to be a defective sector in the verification reading operation that is executed just after the data has been written into the user area. The defective sector generally denotes a sector such that a predetermined signal quality cannot be obtained when the written data is read out due to a minute defect existing on the disk. The map area is an area to write the defect management information indicating which sector in the user area is replaced by which sector in the alternative area.

The region in the disk can be divided into a plurality of bands of up to 63 bands. Each band has a map area, alternative area, and user area. As will be explained hereinafter, there also is a band having no user area. Four tracks (128 sectors) are assigned to each of the map area and the alternative area of each band. The number of tracks of the user area, however, is not determined. The starting track of each area of each band is also not determined. There is also a case where the user designates those settings or there is also a case where the controller automatically sets those settings. In order to store those values, a control track is prepared for a track of a certain fixed track number (other than 0 to 19999) in the disk.

FIG. 2 shows an example of a format of the band division in the disk and the track number of each area. The region in the disk is divided into bands of Nos. #1 through #63. Among them, each of the bands #1 through #62 has a user area and the band #63 doesn't have a user area. The user area of each of the bands #1 to #61 has a size of 314 tracks. The user area of the band #62 has a size of 342 tracks for the adjustment of fraction.

Now, assuming that data is written into a certain sector in the user area #1 and it is determined that such a sector is a defective sector in the verification reading operation which is executed just after the data has been written, the same data is again written into the sector of the smallest address among the unwritten sectors of the alternative area #1. Such an alternative sector is also verified and read. When such an alternative sector is also determined to be a defective sector as a result of the verification, the same data is immediately again written into the next sector. In a manner similar to the above, the same data is written into the alternative area #1 until the result of the verification reading operation indicates a satisfactory state. Consequently, one sector of the alternative area #1 is given to the defective sector of the user area #1. Addresses of those two sectors, as one set, constitute one defect management information. Such information is written into the sector of the smallest address among the unwritten sectors of the map area #1. Such a sector is also verified and read. When such a sector is determined to be a defective sector as a result of the verification, the same data is soon again written into the next sector. In manner similar to the above, the same data is written into the map area #1 until the result of the verification indicates a satisfactory state.

The same shall also apply with respect to the bands #2 to #62. The band #63 is prepared as a spare in a case where the alternative areas or map areas of the bands #1 through #62 overflow. The band #63, accordingly, has no user area.

A construction in the map area will now be described. A region in one sector (512 bytes) in the map area is divided into 128 fields each consisting of four bytes. Three bytes in one field indicate the address of the defective sector in the user area and remaining one byte shows by which sector among the 128 sectors in the alternative area the defective sector is replaced. The data of one sector of the map area can, therefore, express up to 128 defect management information, which number is equal to the number 128 of sectors of the alternative area which are prepared for one band. The defect management information of such a band, consequently, can be expressed by only the information of one sector of the map area. When the information about a certain band overflows, the band #63 as a common overflow area with respect to each band is used.

In case of the WO type optical disk, data cannot be rewritten. When one defect management information occurs in a certain band, therefore, one sector of the map area is certainly consumed in order to write such information. Now, assuming that a defective sector occurs for the first time in a certain band, the data which describes the defect management information to four bytes of the first field is written into the head sector of the map area of such a band. When a defective sector subsequently occurs, the data describing the same defect management information as the previous information is written to four bytes of the first field and the data describing the defect management information which has occurred at present is written into the second sector of the map area for four bytes of the second field. This is because the data of the head sector of the map area cannot be rewritten.

As will be obviously understood from the above description, the latest defect management information about a certain band exists in the last written sector among the 128 sectors of the map area of such a band. When the data is read out from the user area, the latest defect management information is needed. In case of writing data into the user area as well, when a new defective sector occurs, it cannot be determined into which sector in the alternative area the data should be rewritten so long as the latest defect management information doesn't exist. On the other hand, if the sector of the map area in which the latest defect management information has been written is unknown, the address of the sector into which the defect management information should be subsequently written ,also cannot be determined.

Accordingly, when the disk is loaded into the recording/reproducing apparatus, it is necessary to perform sequential operations of reading a control track first so that the track on which the map area of each band exists is known, subsequently the rearmost written sector is found out with regard to all of the map areas, the latest defect management information of each band is read out, and the obtained latest defect management information is written into the RAM.

As one of method of realizing the above operations, there is a method whereby the latest defect management information in the map areas of all of the bands are read after the disk has been loaded, as disclosed also in the Japanese Patent Application document mentioned before.

Figure 3:
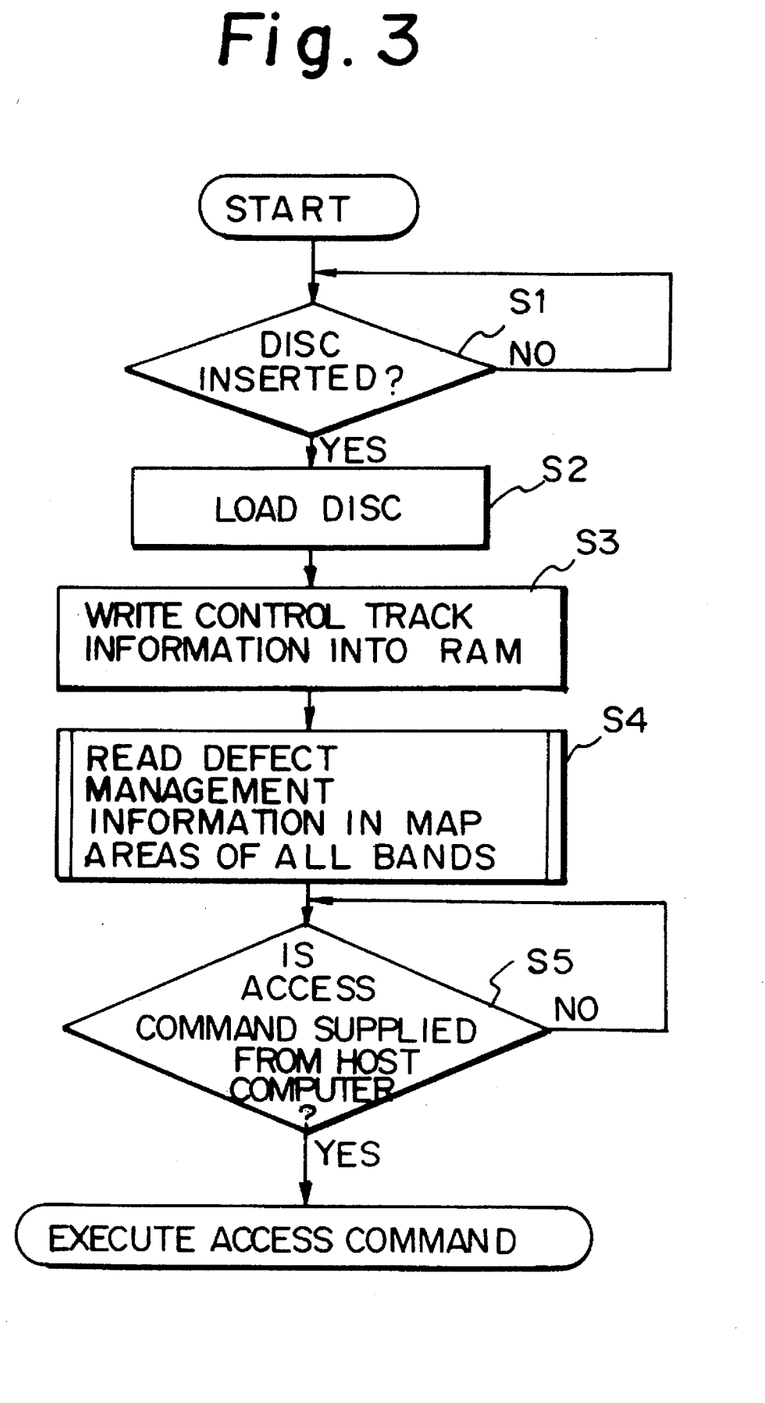
FIGS. 3 to 5 are flowcharts showing processing procedures of conventional recording and reproducing methods.

FIG. 3 is a flowchart showing a processing procedure of such a method.

In FIG. 3, when the insertion of the optical disk into the driving apparatus 2 is detected by detecting means (not shown) such as a microswitch or the like (step S1), the controller controls the loading mechanism 3 so as to place the inserted optical disk 1 onto the turntable 4 (step S2). After that, the controller controls each circuit in order to read out the information of the control track on the optical disk and writes the read-out information into the RAM 14 (step S3). The information indicating from which track each area is started with regard to all of the bands in the optical disk are consequently written into the RAM 14. The controller, further, reads the latest defect management information in the map area with respect to all of the bands on the basis of such information and stores into the RAM 14 (step S4). The controller is set into a mode to wait for a command from the host computer 15 (step S5). When a command is generated, the latest defect management information in the map area of the band designated with respect to the command is read out from the RAM 14. On the basis of such information, the sector corresponding to the designated address of the user area or alternative area is accessed.

According to the above method, just after the optical disk was loaded into the recording/reproducing apparatus, all of the latest defect management information are read and commands to read out, write and the like which are generated from the host computer 15 are subsequently executed. Such a method, however, has a drawback such that a substantial disk loading time, from a time point at which the optical disk has been inserted into the driving apparatus 2 to a time point at which the first command can be executed, requires an additional time that is necessary to read out the defect management information.

On the other hand, there is a method of reading the defect management information in the map area prior to executing the reading mode.

Figure 4:
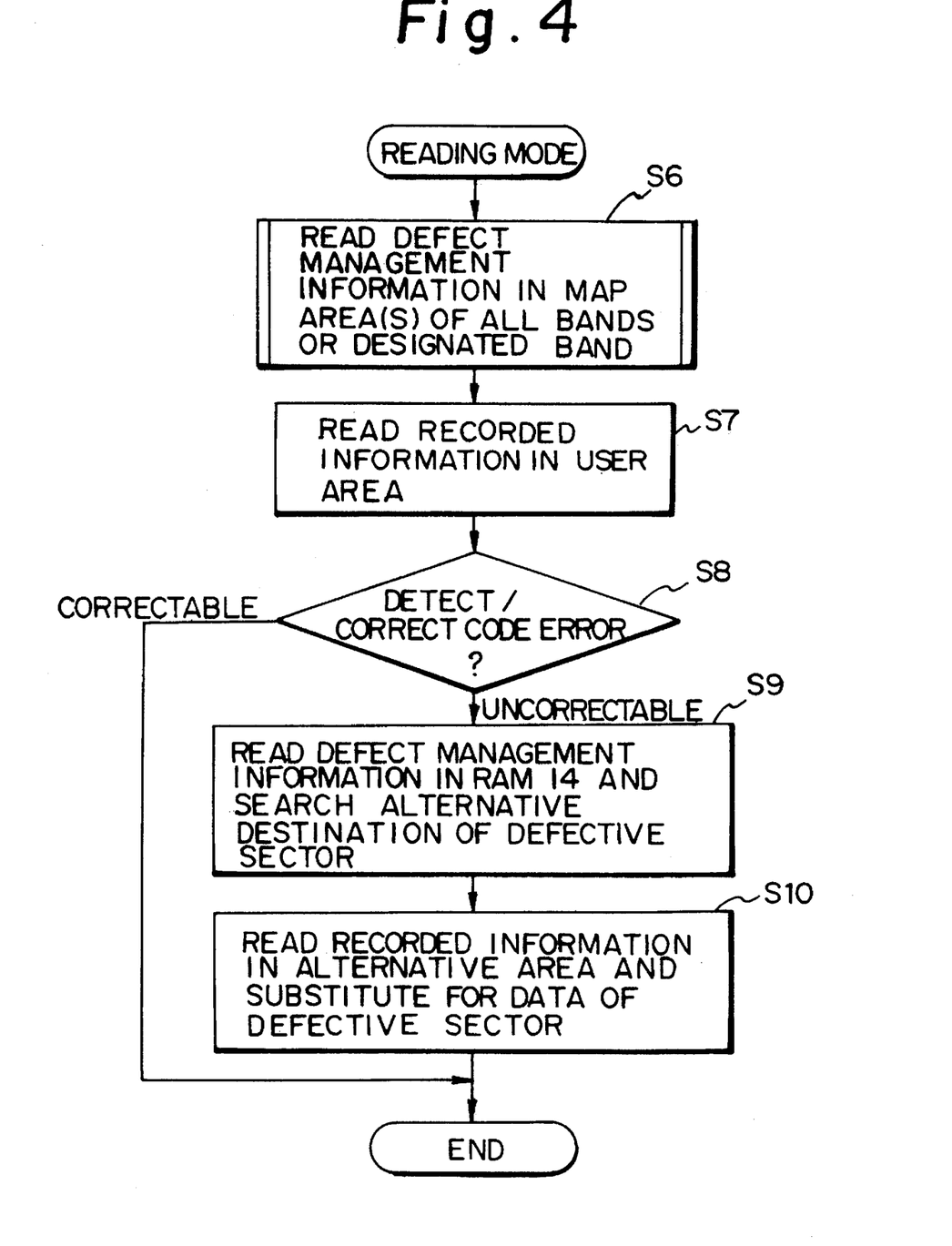

FIG. 4 is a flowchart showing a processing procedure for such a method.

In FIG. 4, when the apparatus is set into the reading mode by receiving the command to read out the recorded information in the optical disk from the host computer 15, the controller reads the map areas of all of the bands or the map area of the relevant band which is designated by the reading mode and stores the latest defect management information into the RAM 14 (step S6). The recorded information in the user area of the band designated by the reading mode is read out (step S7). During the reading operation, the read signal from the pickup 6 is transmitted through the pickup/spindle servo circuit 7 to the data modulating/demodulating circuit 8, from which the demodulating signal is derived and supplied to the parity generating and error correcting circuit 10. In cooperation with an RAM (not shown), the parity generating and error correcting circuit 10 detects a code error by the parity bits and the like which have previously been added to the recorded information signal data and corrects the code error. When the code error cannot be corrected, a correction unable signal is generated. By discriminating the demodulation signal which is supplied, a check is made to see if the reading sector is a defective sector or not (step S8).

When the reading sector is not a defective sector, the information which has been read in step S7 is effective and such information data is transferred to the host computer 15. The reading mode is finished.

When the reading sector is determined to be a defective sector, the defect management information which has already been stored in the RAM 14 is read out and a position of an alternative destination of the defective sector is searched for (step S9). On the basis of the result of the search, the recorded information of the alternative area is read and is replaced by the preceding data of the defective sector which has been held in the buffer RAM and transfer control circuit 12 (step S10). In case of the recorded information of the alternative area based on the latest defect management information in the RAM 14, a possibility such that the reading sector is decided to be a defective sector is almost equal to zero, so that the reading mode is finished at this point.

There is also a method of reading the defect management information in the map area prior to executing the writing mode together with a method in 'the reading mode as mentioned above.

Figure 5:
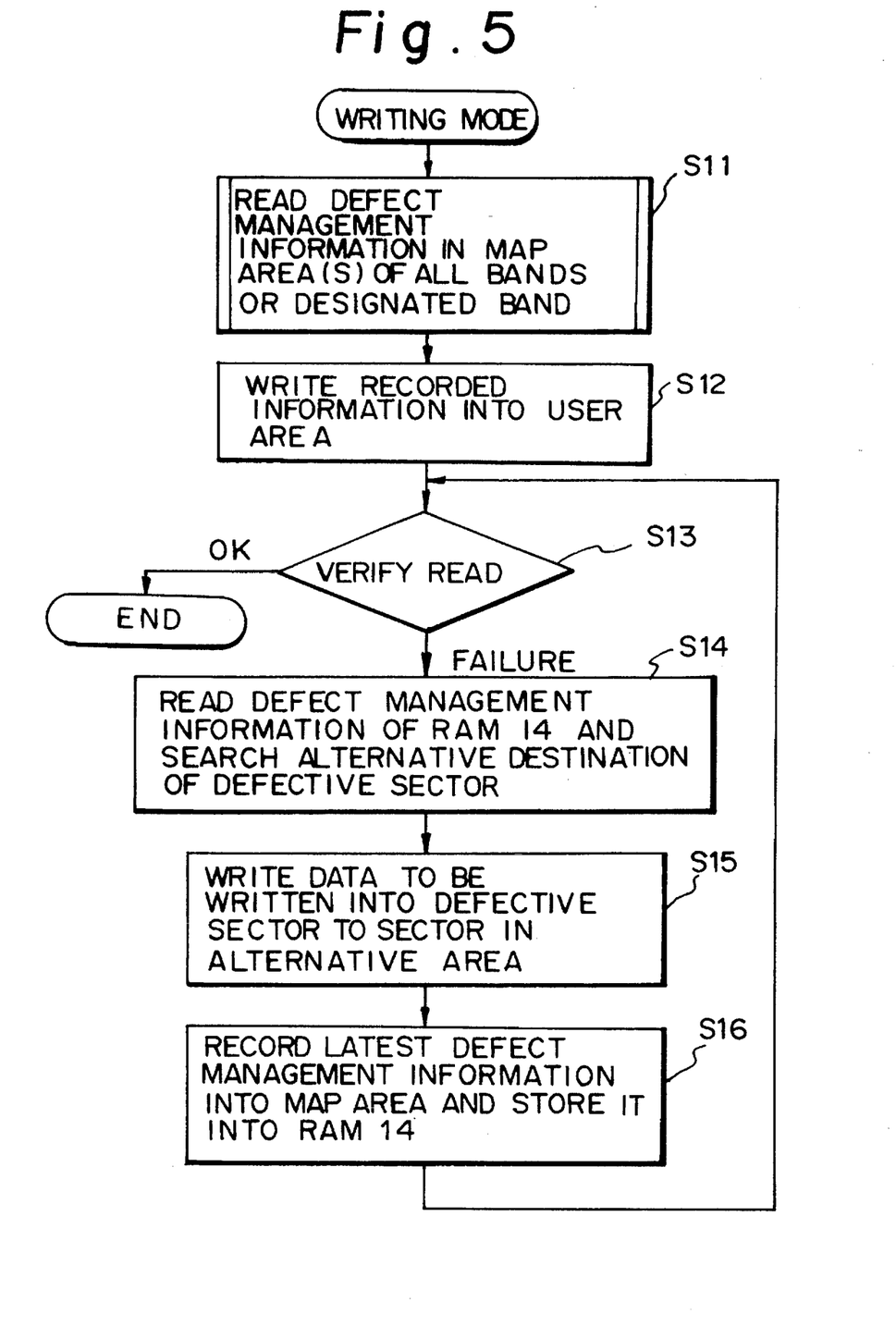

FIG. 5 is a flowchart showing a processing procedure for such a method.

In FIG. 5, when the apparatus is set into the writing mode by receiving the command for reading out the recorded information in the optical disk from the host computer 15, the controller reads the map areas of all of the bands or the map area of the relevant band that is designated by writing mode and stores into the RAM 14 (step S11). The information of a predetermined format is written into the user area of the band designated by the writing mode (step S12).

After the writing of information, the just recorded information is soon read out in order to verify the recorded information. In this instance, the read signal from the pickup 6 is transmitted through the pickup/spindle servo circuit 7 to the data modulating/demodulating circuit 8, from which the demodulation signal is derived. The demodulation signal is compared with the recorded information data held in the buffer RAM and transfer control circuit 12 in the writing mode. In this instance, by discriminating the demodulation signal on the basis of a predetermined threshold reference level, a check is made to see if the reading sector, namely, the writing sector before the verification is a defective sector or not (step S13).

When the result of the verification reading process is OK and it is decided that the writing sector is not a defective sector, the information recorded in step S12 is effective and the writing mode is finished.

When the result of the verification reading process indicates a failure and the writing sector is determined to be a defective sector, the defect management information which has already been stored in the RAM 14 is read out and a position in the alternative area at which the space sector exists is searched for in order to designate the alternative destination of the defective sector (step S14). The same data as the information data written in the user area in step S12 mentioned above is written into the alternative area derived on the basis of the result of the search (step S15). The defect management information indicating that the normal data has been recorded in the alternative area is, further, recorded as latest defect management information into the map area of the optical disk 1 designated by the writing mode and the latest defect management information in the RAM 14 is also rewritten (step S16).

After completion of step S16, the processing routine is again returned to step S13 in order to perform the verification reading process. The processes in steps S14 to S16 are repeated until the result of the verification reading process is satisfactory.

Conditions for recognizing a state in which the result of the verification reading process in the writing mode indicates a defective sector are set fairly strictly. In many cases, actually, even if there is a defect, such a defect lies within a range of an enough error correcting ability. In the verifying mode, for example, the presence of a defect is determined when there is a burst error of 23 bytes. It is generally known that the number of bytes of the maximum correctable burst error in the reading mode is equal to 54 bytes. This is because there is presumed the presence of a possibility such that the burst error increases due to an aging change of the disk. Even if the presence of a defect is determined by the verification, it cannot be concluded that the reproduction of the recorded information in the reading mode is absolutely impossible.

As mentioned above, when the data is replaced in the alternative area even if the data can be sufficiently read in the reading mode, the information in the alternative area is read, so that a useless operation of reading the defect management information prior to executing the reading mode is required. The above method is, thus, inadequate to quickly perform the operation in response to a command of the reading mode, writing mode, or the like.

SUMMARY AND OBJECTS OF THE INVENTION

This invention is made to eliminate the drawbacks in the conventional methods mentioned above and it is an object of this invention to provide a recording and reproducing method for a writable type disk driving apparatus, in which the substantial loading time of an optical disk can be greatly reduced and the operation can be rapidly executed in response to a command.

According to a first aspect of the present invention, there is provided a recording and reproducing method for a writable type disk driving apparatus for a disk in which an information recording area is divided into a plurality of bands and every band has a defect management information recording area. In the method, latest defect management information indicative of an address of a defective sector in the disk and an address of an alternative sector for the defective sector is recorded into a predetermined sector in the defect management information recording area, and the disk is driven so as to record information or to read recorded information by accessing to a designated address while referring to the latest defect management information, wherein at the time of recording of information, after the information has been written into the information recording area of the designated address, reading operation of the latest defect management information is executed only when the result of a verification reading process of the written information indicates a failure.

According to a second aspect of the present invention there is provided a recording and reproducing method for a driving apparatus for a writable type disk in which an information recording area is divided into a plurality of bands and every band has a defect management information recording area. In the method, latest defect management information indicative of an address of a defective sector in the disk and an address of an alternative sector for the defective sector is recorded into a predetermined sector in the defect management information recording area, and the disk is driven so as to record information or to read recorded information by accessing to a designated address while referring to the latest defect management information, wherein at the time of reading of the recorded information, after the recorded information in the information recording area of the designated address has been read, reading operation of the latest defect management information is executed only in the case where the read recorded information cannot be reproduced.

According to the recording and reproducing method of a driving apparatus for the writable type disk of the invention, at the time of recording of information, after the information has been written into the information recording area of the designated address, the reading operation of the latest defect management information is executed, only in the case where the result of the verification reading process of the written information indicates a failure. At the time of reading of the recorded information, after the recorded information in the information recording area of the designated address has been read, reading operation of the latest defect management information is executed only in the case where the read recorded information cannot be reproduced.

DETAILED DESCRIPTION OF THE PREFERRED EMBODIMENT

An embodiment of the invention will be described in detail hereinafter with reference to the drawings.

A recording and reproducing method of the embodiment can be applied to the driving apparatus for a writable type disk shown in FIG. 1.

In the embodiment, when a disk is inserted, none of the defect management information is read and only the minimum necessary defect management information is read out from the optical disk in one reading or writing mode operation.

In the reading mode, the recorded information in the user area is first read. Only when a range of the reading correcting ability of the error correcting circuit 10 is exceeded, the latest defect management information in the map area of the optical disk is read and on the basis of the read information, the recorded information in the alternative area is read. When the range of reading correcting ability is not exceeded, the read recorded information in the user area is made effective and the operation is finished.

Figure 6:
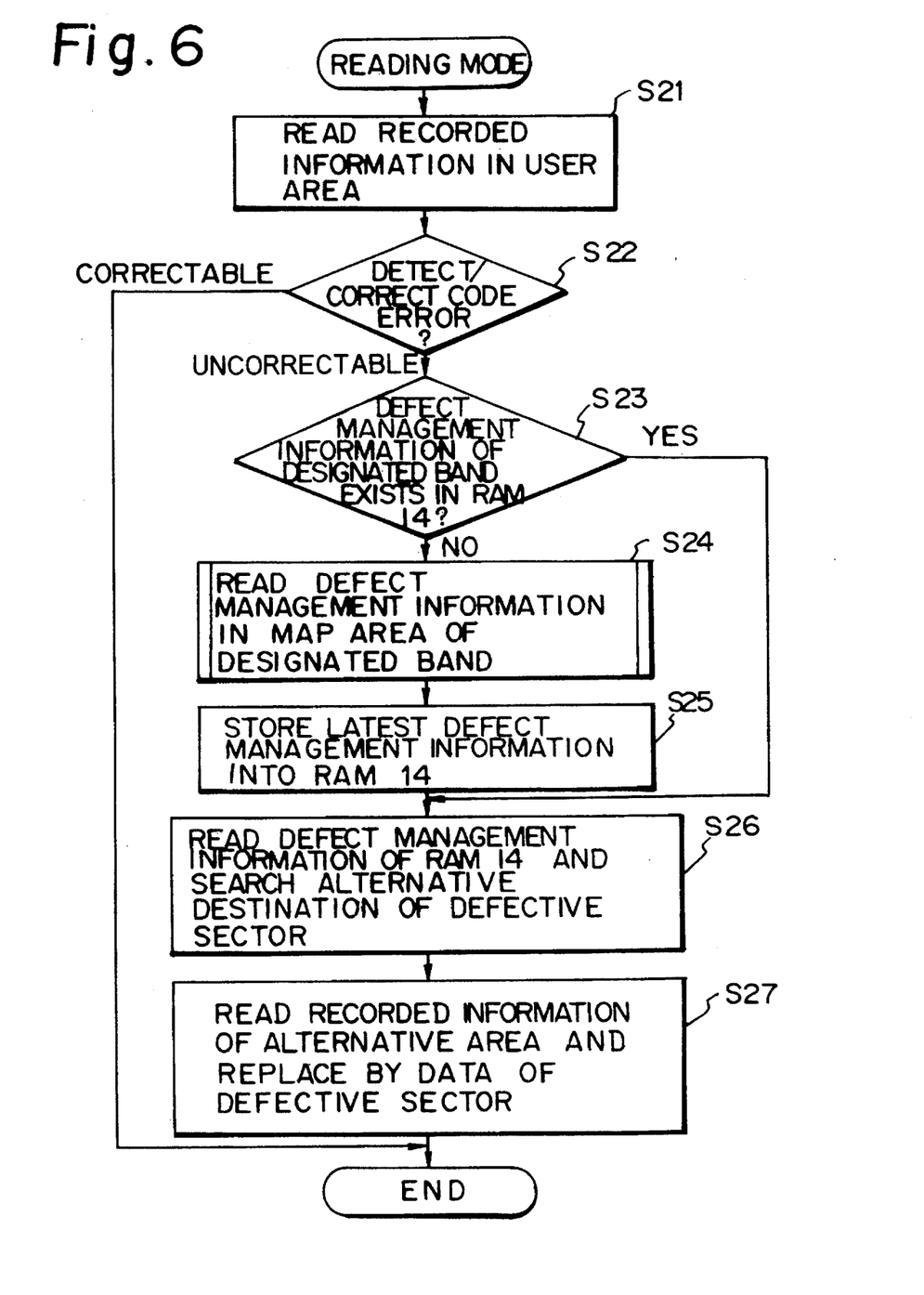
FIG. 6 is a flowchart showing a processing procedure of a recording and reproducing method in the reading mode according to the present invention.

FIG. 6 is a flowchart showing a processing procedure in the reading mode according to the invention.

In the diagram, when the apparatus is set into the reading mode by receiving the command for reading out the recorded information in the optical disk from the host computer 15, the controller reads the recorded information in the user area which is designated by the reading mode (step S21). In the reading mode, the read signal from the pickup 6 is transmitted through the pickup/spindle servo circuit 7 to the data modulating/demodulating circuit 8, from which the demodulating signal is derived and supplied to the parity generating and error correcting circuit 10. In cooperation with an RAM (not shown), the parity generating and error correcting circuit 10 detects a code error by parity bits or the like which have previously been added to the recorded information signal data and corrects it. When the error cannot be corrected, the circuit 10 generates a correction unable signal. By discriminating the demodulation signal which is supplied, a check is made to see if the reading sector is a defective sector or not (step S22).

When the demodulating signal indicates that the error correcting ability lies within the reading correcting ability range and it is determined that the reading sector is not a defective sector, the information which has been read in step S21 is effective and such information data is transferred to the host computer 15 and the reading mode is finished.

When the demodulating signal indicates that the error correcting ability exceeds the reading correcting ability range and the reading sector is determined to be a defective sector, a check is made to see if the latest defect management information of the relevant band designated by the reading mode has been stored in the RAM or not (step S23). When the defect management information of the relevant band is not stored in the RAM 14, that is, for example, in case of the first reading mode after the turn-on of a power source or the like, the RAM 14 is in the clear state, so that the processing routine advances to step S24. The latest defect management information in the map area of the relevant band is read out from the optical disk 1. The read defect management information is stored into the RAM 14 (step S25).

The defect management information of the band designated by the reading mode is subsequently read out from the RAM 14 and the alternative destination of the defective sector is searched (step S26). On the basis of the result of the search, the recorded information of the alternative area is further read and is replaced by the data of the preceding defective sector which has been held in the buffer RAM and transfer control circuit 12 (step S27). In the recorded information of the alternative area which is based on the latest defect management information in the RAM 14, the reading mode is finished at this point since a possibility such that the reading sector is determined to be a defective sector is almost zero.

If it is determined in step S23 that the latest defect management information of the relevant band has been stored in the RAM 14, there is no need to newly read out the latest defect management information from the optical disk.

The processing routine, therefore, jumps steps S24 and S25 without accessing the optical disk 1 and directly advances to step S26.

It should be noted in the above reading mode that after the recorded information of the user area of the band designated by the reading mode has been first read irrespective of the defect management information as shown in step S21, only in the case where the read recorded information is out of the reading correcting ability range in step S21, the reading operation of the defect management information and the alternating operation of the recorded information in step S23 and subsequent steps are executed. Since unnecessary operations can be avoided by such a method, the operation can be quickly executed in response to the command of the reading mode.

In the writing mode, on the other hand, the information is first recorded into the user area of the designated band and the recorded information is verified and read after that. In this case, if the result of the verification reading process is satisfactory, the recorded information of the user area is made effective and the operation is finished. If the result of the verification indicates a failure, the latest defect management information in the map area of the optical disk is read only once and, while the read defect management information is stored into the memory, the correct information to be recorded is written into the alternative area.

Figure 7:
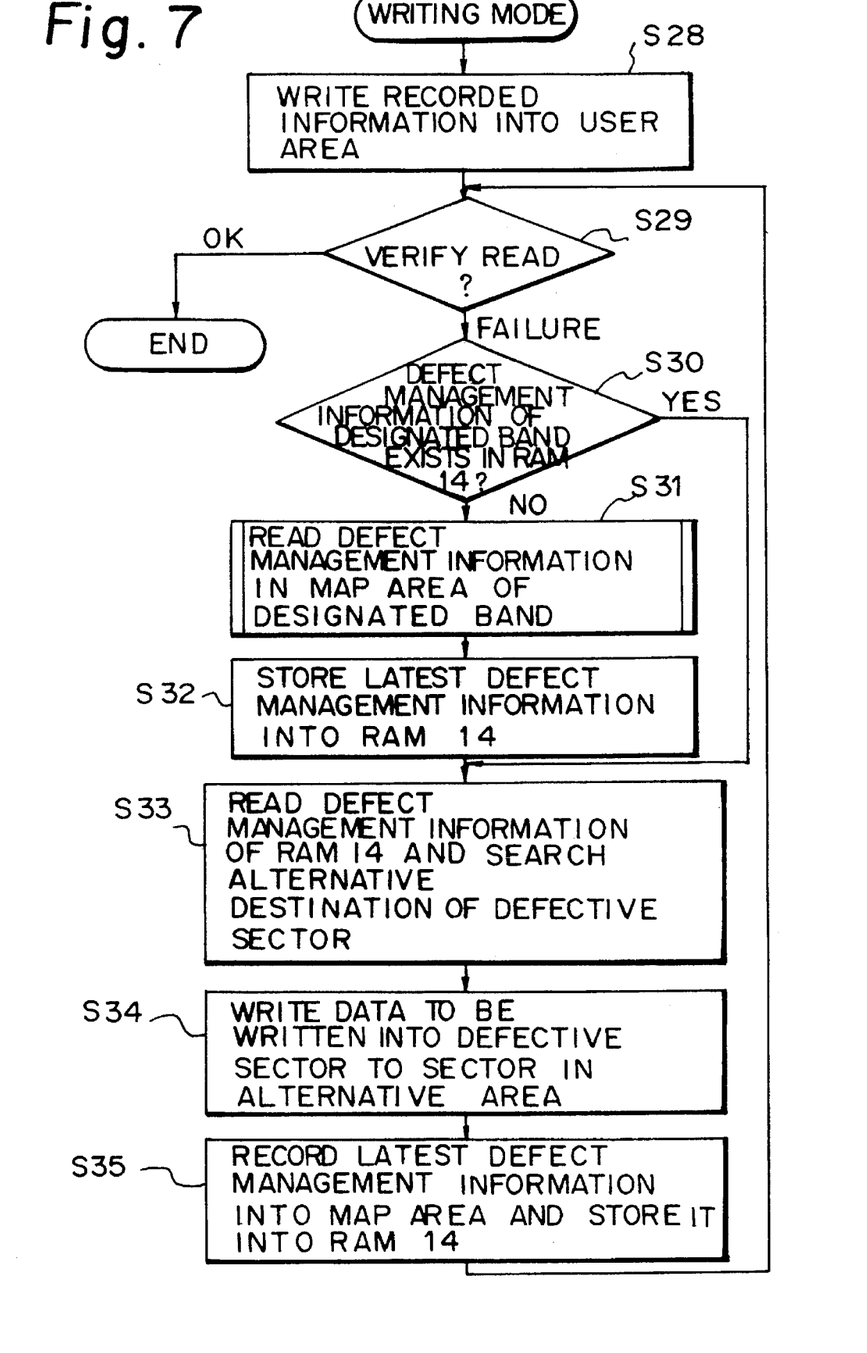
FIG. 7 is a flowchart showing a processing procedure of a recording and reproducing method in the writing mode according to the invention.

FIG. 7 is a flowchart showing a processing procedure in the writing mode according to the invention.

In the diagram, when the apparatus is set into the writing mode by receiving the command to read out the recorded information in the optical disk from the host computer 15, the controller writes the information to be recorded into the user area which is designated by the writing mode (step S28).

After the information was written, the recorded information is read out in order to verify and read the recorded information. In this instance, the read signal from the pickup 6 is transmitted through the pickup/spindle servo circuit 7 to the data modulating/demodulating circuit 8, from which the demodulation signal is derived. The demodulation signal is compared with the recorded information data held in the buffer RAM and transfer control circuit 12 in the writing mode. In this instance, by discriminating the demodulation signal on the basis of a predetermined threshold reference level, a check is made to see if the reading sector, namely, the writing sector before the verification is a defective sector or not (step S29).

When it is determined that the writing sector is not a defective sector, the information recorded in step S28 is effective and the writing mode is finished.

When the writing sector is determined to be a defective sector, a check is made to see if the latest defect management information of the relevant band designated by the writing mode has been stored in the RAM 14 or not (step S30). In a case where the latest defect management information of the relevant band is not stored in the RAM 14, that is, for instance, in case of the first writing mode after turning on power current or the like, since the RAM 14 is in the clear state, the processing routine advances to step S31 and the latest defect management information in the map area of the relevant band is read out from the optical disk 1. The read defect management information is stored into the RAM 14 (step S32).

The defect management information of the band which is designated by the writing mode is subsequently read out from the RAM 14 and a position in the alternative area at which the space sector exists is searched for in order to designate the alternative destination of the defective sector (step S33). The same data as the information data written in the user area in step S28 mentioned above is written into the alternative area derived on the basis of the result of the search (step S34). The defect management information indicating that the normal data has been recorded in the alternative area is further recorded as latest defect management information into the map area of the optical disk 1 which is designated by the writing mode and the latest defect management information in the RAM 14 is also rewritten (step S35).

When it is determined in step S30 that the latest defect management information of the relevant band has been stored in the RAM 14, there is no need to newly read the latest defect management information from the optical disk. The processing routine, therefore, jumps steps S31 and S32 without accessing to the optical disk 1 and directly advances to step S33.

After completion of step S35, the processing routine is again returned to step S29 for a verification reading process. The processes in steps S30 to S35 are repeated until the result of the verification reading process is satisfactory.

It should be noted in the above writing mode that after the information to be recorded in the user area of the band which is designated by the writing mode was first written irrespective of the defect management information as shown in step S28, only in a case where the result of the verification reading process indicates a failure as shown in step S29, the reading operation of the defect management information and the alternating operation of the recorded information in step S30 and subsequent steps are executed. Since the unnecessary operations can be avoided by the above method, the operation can be quickly executed in response to the command of the writing mode.

In the above embodiment, since the defect management information is read every reading or writing mode, there is no need to read the defect management information upon insertion of the disk. The substantial loading time of the disk can be remarkably reduced.

When there is no defect in the optical disk, further, the map area is not accessed. Even when there is a defect, on the other hand, in such a case, the map area is accessed only once in a manner similar to the conventional method and the defect management information is stored into the RAM, so that there is no adverse influence as compared with the prior art disclosed in the Patent Application mentioned at the beginning of the present application.

As described above, in the recording and reproducing method for the driving apparatus of a writable type disk according to the invention, at the time of recording information, the reading operation of the latest defect management information is executed only when the result of the verification reading process of the written information indicates a failure after the information was written into the information recording area of the designated address. At the time of reading the recorded information, after the recorded information in the information recording area of the designated address was read, only in a case where the read recorded information cannot be reproduced, the reading operation of the latest defect management information is executed. The substantial loading time of the disk, consequently, can be extremely reduced and the operation can be promptly executed in response to the command.

What is claimed is:

1. A recording and reproducing method for a writable type disk driving apparatus for driving a writable type disk in which an information recording area is divided into a plurality of bands and every band has a defect management information recording area, the method comprising:

recording latest defect management information at a predetermined sector in the defect management information recording area, the latest defect management information being indicative of (i) an address of a defective sector in the disk and (ii) an address of an alternative sector for the defective sector;

recording information by accessing a designated address immediately in response to a write command;

verifying whether the information was accurately recorded at the designated address; and reading the latest defect management information from the writable type disk only if said verifying determines that the information was not accurately recorded at the designated address.

2. A recording and reproducing method for a writable type disk driving apparatus for a writable type disk in which an information recording area is divided into a plurality of bands and every band has a defect management information recording area, said method comprising:

recording latest defect management information at a predetermined sector in the defect management information recording area, the latest defect management information being indicative of (i) an address of a defective sector in the disk and (ii) an address of an alternative sector for the defective sector;

reading pre-recorded information by accessing a designated address immediately in response to a read command; and reading the latest defect management information from the writable type disk only if the pre-recorded information cannot be reproduced after the recorded information in the information recording area of the designated address has been read.

3. A method according to claim 1, wherein said writable type disk driving apparatus has memory means for storing latest defect management information and wherein said in said reading operation, only in a case where the latest defect management information of said designated address is not stored in said memory means, said latest defect management information is read and stored into said memory means.

4. A method according to claim 1, wherein said writable type disk driving apparatus has memory means for storing latest defect management information wherein in said reading operation, only in a case where the latest defect management information is not stored in said memory means, said latest defect management information is read and stored into said memory means.

* * * * *